US012225465B2

(12) United States Patent
Li

(10) Patent No.: US 12,225,465 B2
(45) Date of Patent: Feb. 11, 2025

(54) MONITORING METHOD, INSTRUCTION SENDING METHOD AND DEVICE, AND COMMUNICATION APPARATUS

(71) Applicant: Beijing Xiaomi Mobile Software Co., Ltd., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 90 days.

(21) Appl. No.: 17/596,922

(22) PCT Filed: Jun. 26, 2019

(86) PCT No.: PCT/CN2019/093116
§ 371 (c)(1),
(2) Date: Dec. 21, 2021

(87) PCT Pub. No.: WO2020/258103
PCT Pub. Date: Dec. 30, 2020

(65) Prior Publication Data

US 2022/0322170 A1 Oct. 6, 2022

(51) Int. Cl.
*H04W 52/02* (2009.01)
*H04W 36/24* (2009.01)
*H04W 36/00* (2009.01)

(52) U.S. Cl.
CPC ....... *H04W 52/0229* (2013.01); *H04W 36/24* (2013.01); *H04W 36/00837* (2018.08)

(58) Field of Classification Search
CPC ............. H04W 36/0083; H04W 36/08; H04W 52/0229; H04W 36/24; H04W 52/0216;
(Continued)

(56) References Cited

U.S. PATENT DOCUMENTS

2018/0332655 A1 11/2018 Ang et al.
2019/0150114 A1 5/2019 Liu et al.
2022/0046541 A1* 2/2022 Wu ....................... H04L 5/0048

FOREIGN PATENT DOCUMENTS

CN 109219116 A 1/2019
CN 109496452 A 3/2019
(Continued)

OTHER PUBLICATIONS

"Cross cell group power management in MR-DC," Proceedings of the 3GPP TSG-RAN WG2 Meeting #106, Qualcomm Inc, Media Tek, Huawei, R2-1906709, Revision of R2-1903053, May 13, 2019, Reno, Nevada, 3 pages.
(Continued)

*Primary Examiner* — Marcos L Torres
(74) *Attorney, Agent, or Firm* — McCoy Russell LLP

(57) ABSTRACT

Provided in embodiments of the present disclosure are a PDCCH monitoring method and device, an instruction sending method and device, a communication apparatus and a non-transitory computer-readable storage medium. The PDCCH monitoring method comprises: switching from a source cell to a target cell; and if a time point at which wake up signaling (WUS) within the target cell is to be monitored is missed, performing PDCCH monitoring according to a monitoring scheme on the basis of a result indicating that the WUS has been detected.

5 Claims, 6 Drawing Sheets

Terminal
Base station
Switch from a source cell to a target cell
If a monitoring time of WUS in the target cell is missed, monitor the PDCCH according to a monitoring strategy and a result that the WUS has been monitored
PDCCH

(58) Field of Classification Search
CPC ... H04W 76/28; H04B 17/318; H04B 17/382; H04L 5/0053; Y02D 30/70
See application file for complete search history.

(56) References Cited

FOREIGN PATENT DOCUMENTS

| | | | |
|---|---|---|---|
| CN | 109496454 | A | 3/2019 |
| CN | 109923904 | A | 6/2019 |
| CN | 109923914 | A | 6/2019 |
| WO | 2018202693 | A1 | 11/2018 |
| WO | 2019064208 | A1 | 4/2019 |

OTHER PUBLICATIONS

"Further discussion on UE behavior upon reception of WUS," Proceedings of the TSG-RAN WG2 Meeting #106, R2-1906703, May 13, 2019, Reno, Nevada, 4 pages.

* cited by examiner

MONITORING METHOD, INSTRUCTION SENDING METHOD AND DEVICE, AND COMMUNICATION APPARATUS

CROSS REFERENCE TO RELATED APPLICATION

The present application is a U.S. National Phase of International Application No. PCT/CN2019/093116 entitled "MONITORING METHOD, INSTRUCTION SENDING METHOD AND DEVICE, COMMUNICATION APPARATUS, AND STORAGE," and filed on Jun. 26, 2019. The entire contents of the above-listed application is hereby incorporated by reference for all purposes.

TECHNICAL FIELD

The present application relates to, but is not limited to, the field of wireless communications, and particularly relates to a method and apparatus for monitoring a Physical Downlink Control Channel (PDCCH), a method and apparatus for sending an instruction.

BACKGROUND

A terminal has a Discontinuous Reception (DRX) state, and the terminal in the DRX state has lower power consumption than the terminal in a connected state.

A DRX cycle is set in the DRX state. Referring to FIG. 1, the DRX cycle includes: a wake up period (On Duration) and a sleep period (Opportunity for DRX).

During the wake up period, the terminal is in a wake up state, and the terminal can monitor a physical downlink control channel (PDCCH); during the sleep period, the terminal is in a dormant state, and the terminal cannot monitor the PDCCH.

In order to further save the power consumption of the terminal in the DRX state, Wake UP Signaling (WUS) is also introduced. The WUS is sent before the wake up period. The terminal determines whether to maintain the wake up state in the subsequent wake up period by monitoring the WUS, to monitor the PDCCH.

SUMMARY

According to a first aspect of the examples of the present application, a method for monitoring a PDCCH is provided, including:

switching from a source cell to a target cell, and if a monitoring time of Wake UP Signaling (WUS) in the target cell is missed, monitoring the PDCCH according to a monitoring strategy and a result that the WUS has been monitored.

According to a second aspect of the examples of the present application, a method for sending an instruction is provided, including:

sending a monitoring instruction, the monitoring instruction is used to switch from a source cell to a target cell, and to determine a result that wake up signaling has or has not been monitored in respond to the wake up signaling on the target cell is missed.

According to a third aspect of the examples of the present application, a communication device is provided, including:

a transceiver, a memory, and a processor, connected to the transceiver and the memory respectively, configured to control the transmission and reception of the transceiver by executing computer-executable instructions stored on the memory, and being capable of implementing the method for monitoring a physical downlink control channel or the method for sending an instruction according to any of the foregoing technical solutions.

DETAILED DESCRIPTION

The network architecture and service scenario described in the examples of the present application are intended to more clearly illustrate the technical solutions of the examples of the present application, and do not constitute limitations on the technical solutions provided in the examples of the present application. Those of ordinary skill in the art can know that, with the evolution of the network architecture and the emergence of new service scenarios, the technical solutions provided in the examples of the present application are also applicable to similar technical problems.

Figure 2:
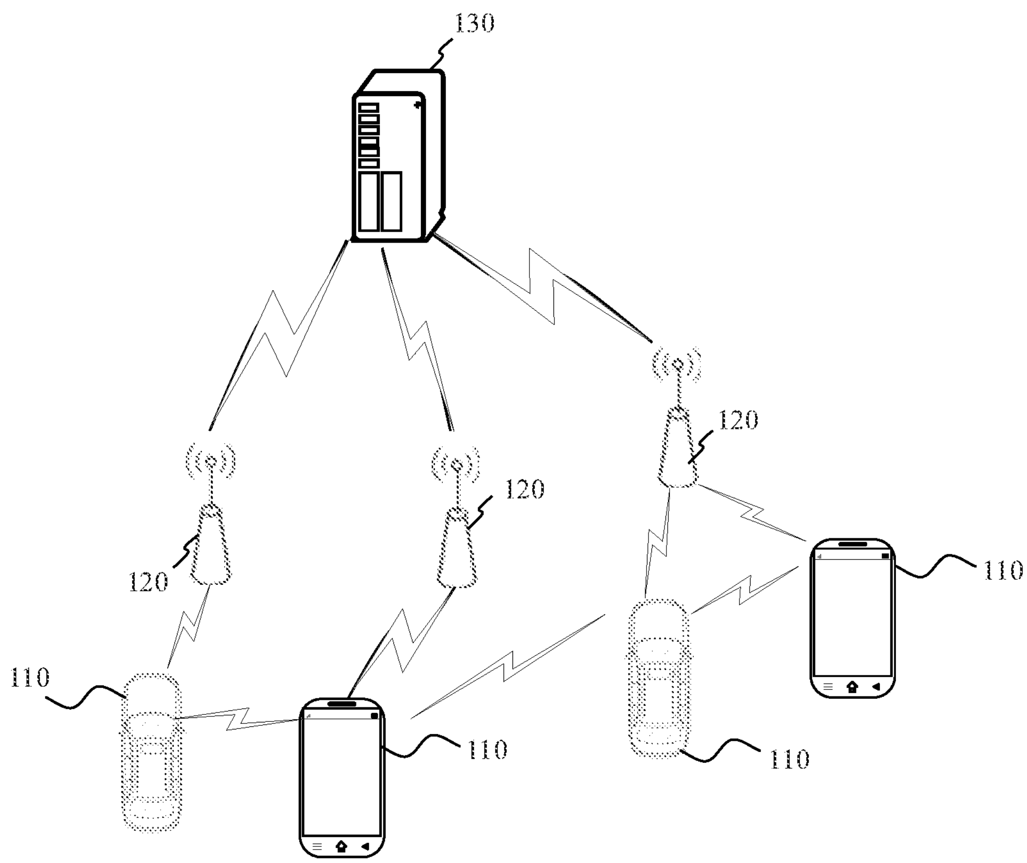
FIG. 2 is a schematic structural diagram of a wireless communication system according to an example of the present application.

Referring to FIG. 2, a schematic structural diagram of a wireless communication system according to an example of the present application is shown. As shown in FIG. 2, the wireless communication system is a communication system based on cellular mobile communication technology. The wireless communication system may include a number of terminals 110 and a number of base stations 120.

The terminal 110 may be a device that provides voice and/or data connectivity to a user. The terminal 110 may communicate with one or more core networks via a Radio Access Network (RAN). The terminal 110 may be an Internet of Things terminal, such as a sensor device, a mobile phone (or "cellular" phone), and a computer with an Internet of Things terminal, for example, it may be a fixed, portable, pocket-sized, hand-held, computer built-in or vehicle-mounted apparatus. For example, the terminal 110 is a station (STA), a subscriber unit, a subscriber station, a mobile station, a mobile, a remote station, an access point, a remote terminal, an access terminal, a user terminal, a user agent, a user device, or user equipment (UE). Alternatively, the terminal 110 may also be a device of an unmanned aerial vehicle. Alternatively, the terminal 110 may also be a vehicle-mounted device, for example, it may be a trip computer with a wireless communication function, or a wireless communication device connected to a trip computer. Alternatively, the terminal 110 may also be a roadside device, for example, it may be a street lamp, a signal lamp, or other roadside device with a wireless communication function.

The base station 120 may be a network side device in a wireless communication system. The wireless communication system may be the 4th generation mobile communication (4G) system, also known as the Long Term Evolution (LTE) system; or, the wireless communication system may also be the 5G system, also known as the new radio (NR) or 5G NR system. Alternatively, the wireless communication system may also be a next-generation system of the 5G system. The access network in the 5G system may be called NG-RAN (New Generation-Radio Access Network).

The base station 120 may be an evolved base station (eNB) used in the 4G system. Alternatively, the base station 120 may also be a base station (gNB) adopting a central distributed architecture in the 5G system. In the case the base station 120 adopts a central distributed architecture, it usually includes a central unit (CU) and at least two distributed units (DUs). The central unit is provided with protocol stacks of a Packet Data Convergence Protocol (PDCP) layer, a Radio Link Control (RLC) layer, and a Media Access Control (MAC) layer; and the distributed unit is provided with a Physical (PHY) layer protocol stack. The example of the present application does not limit the specific implementation of the base station 120.

A wireless connection can be established between the base station 120 and the terminal 110 through a wireless air interface. In different examples, the wireless air interface is a wireless air interface based on the fourth-generation mobile communication network technology (4G) standards; or, the wireless air interface is a wireless air interface based on the fifth-generation mobile communication network technology (5G) standards, for example, the wireless air interface is new radio; or, the wireless air interface may also be a wireless air interface based on 5G-based next-generation mobile communication network technology standards.

In some examples, an E2E (End to End) connection may also be established between the terminals 110. For example, V2V (vehicle to vehicle) communication, V2I (vehicle to Infrastructure) communication and V2P (vehicle to pedestrian) communication in vehicle to everything (V2X) communication may be established.

In some examples, the above-mentioned wireless communication system may further include a network management device 130.

The base stations 120 are connected to the network management device 130 respectively. The network management device 130 may be a core network device in the wireless communication system. For example, the network management device 130 may be a Mobility Management Entity (MME) in an Evolved Packet Core (EPC). Alternatively, the network management device may also be other core network devices, such as a Serving GateWay (SGW), a Public Data Network GateWay (PGW), a Policy and Charging Rules Function (PCRF) unit, or a Home Subscriber Server (HSS). The implementation form of the network management device 130 is not limited in the example of the present application.

Figure 3A:
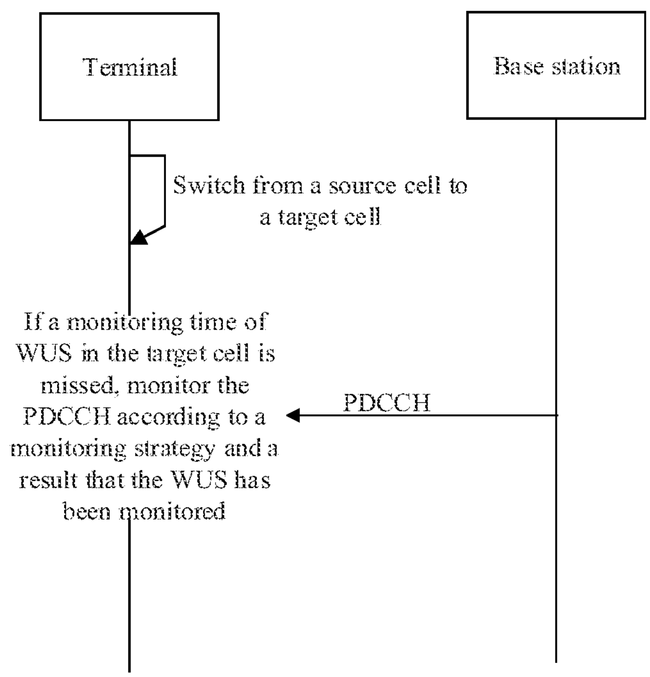
FIG. 3A is a schematic flowchart of a method for monitoring a PDCCH according to an example of the present application.

As shown in FIG. 3A, this example provides a method for monitoring a physical downlink control channel (PDCCH), including:

A source cell is switched to a target cell, and if a monitoring time of WUS in the target cell is missed, the PDCCH is monitored according to a monitoring strategy and a result that the WUS has been monitored.

In response to the terminal missing the monitoring time of wake up signaling on the target cell when switched from the source cell to the target cell, the terminal monitors the PDCCH according to the monitoring strategy and the result that the wake up signaling has been monitored. The monitoring is processed according to the result that the WUS has been monitored. As such, compared with a related technology that any monitoring strategy is not set in the terminal but a PDCCH monitoring decision is made, the technical solution can reduce the phenomenon of processing confusion of the terminal that does not know to process, and reduce the situation that PDCCH monitoring is not performed when required and PDCCH monitoring is performed when not required due to the random choice of the terminal on whether to perform PDCCH monitoring.

Figure 3B:
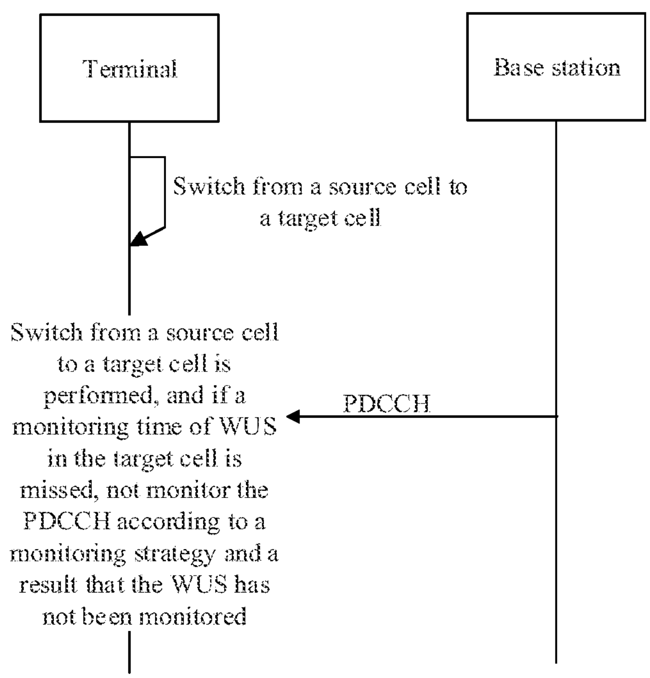
FIG. 3B is a schematic flowchart of a method for monitoring a PDCCH according to an example of the present application.

As shown in FIG. 3B, this example provides a method for monitoring a physical downlink control channel (PDCCH), including:

switching from a source cell to a target cell is performed, and if a monitoring time of WUS in the target cell is missed, the PDCCH is not monitored according to a monitoring strategy and a result that the WUS has not been monitored.

In this example, the source cell and the target cell may be different cells formed by the same base station, or may be cells formed by different base stations.

In this example, the terminal is switched in different cells. The switching from a source cell to a target cell here includes:

the terminal establishing a connection with a source base station in the source cell is changed to: the terminal establishing a connection with a target base station in the target cell, which is equivalent to completing a strong switch of the terminal from the source cell to the target cell;

and/or, the terminal interacting with the source base station in the source cell is changed to: the terminal interacting with the target base station in the target cell. The content of interaction here includes: data, signal and/or signaling, etc.

Wake Up Signaling (WUS) is set on both the source cell and the target cell. The base station sends WUS before a wake up period of a DRX cycle, the WUS being used to inform the terminal whether to maintain a wake up state in one or more wake up periods after the WUS, so as to monitor the PDCCH in the wake up period(s).

WUS is low-power detection signaling, so that the terminal can complete the detection or monitoring of the WUS with very low power consumption, and further determine whether to monitor the PDCCH in the corresponding wake up period according to the WUS monitoring result. If the terminal does not monitor the WUS in the corresponding wake up period, it can skip the wake up period, that is, still maintain a dormant state in the wake up period, so as not to monitor the PDCCH, which further saves the power consumption of the terminal.

In this example, the terminal is switched to the target cell at time T0, then time T1 prior to the time T0 is a monitoring time of WUS1, and the WUS1 that needs to be monitored at time T1 is the wake up signaling.

In this example, the terminal missing a monitoring time of WUS in the target cell includes: the terminal missing a monitoring time of previous WUS in the target cell prior to the current time.

In some examples, the terminal may be moved. In order to ensure communication quality after the movement, the terminal is switched from the source cell to the target cell.

In other examples, when loads of cells are balanced, some terminals may be switched from the source cell to the target cell.

However, after the terminal is switched to the target cell, it may just miss the monitoring time of the wake up signaling on the target cell. Then, the terminal does not know how to monitor the PDCCH in the wake up period.

In view of this, in this example, the terminal will monitor the PDCCH according to a monitoring instruction and a result that the wake up signaling has currently been monitored, or not monitor the PDCCH according to a result that the wake up signaling has currently not been monitored; as such, the phenomenon of monitoring confusion of the terminal which does not know how to process is reduced.

In this example, the monitoring of the PDCCH is to monitor whether there is signaling on the PDCCH. The PDCCH can be used to transmit PDCCH signaling and the like. The PDCCH corresponds to a specific time-frequency resource. When the terminal monitors the PDCCH in the wake up period, it can perform signaling detection on the time-frequency resource corresponding to the PDCCH, thereby realizing the monitoring of the PDCCH.

The result that WUS is monitored includes but is not limited to: the signal strength of WUS in the target cell is monitored to reach a strength threshold, etc.; if WUS is not monitored or the strength of the monitored WUS does not reach the strength threshold, it can be considered that WUS has not been monitored.

In some examples, the monitoring strategy may include: first strategy information indicating whether the missed WUS is monitored.

In other examples, the monitoring strategy further includes:

second strategy information indicating the monitoring of the PDCCH according to the monitoring result of the WUS.

In other examples, the first strategy information includes, but is not limited to: a determination mode and/or a determination parameter for determining the monitoring result of the missed WUS.

In other examples, the method further includes:

Before whether to perform the monitoring of the PDCCH is determined, the monitoring result of the missed WUS is determined according to the first strategy information in the monitoring strategy.

In some other examples, the method further includes: it is determined according to the second strategy information and the monitoring result of the missed WUS that the PDCCH will be or not be monitored.

In some examples, the monitoring strategy may also include only the second strategy information. Then, the monitoring result of the missed WUS is determined according to information other than the monitoring strategy.

In some examples, monitoring the PDCCH according to a monitoring instruction and a result that the wake up signaling has been monitored includes:

the PDCCH is monitored in wake up periods within an effective range of the wake up signaling according to the monitoring instruction and the result that the wake up signaling has been monitored.

One WUS corresponds to a specific PDCCH monitoring range, and the monitoring range may be the aforementioned effective range.

For example, one WUS may correspond to one or more wake up periods in a DRX cycle, and these wake up periods are the effective range corresponding to the WUS.

That is, the mapping relationship between the wake up signaling and the wake up period may be 1:1; or, 1:N, where N is a positive integer equal to or greater than 2.

Figure 4:
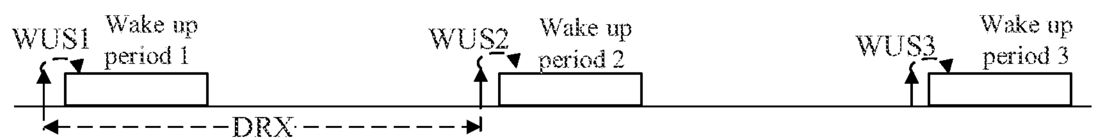
FIG. 4 is a schematic diagram of a 1:1 mapping relationship between a WUS and a wake up period according to an example of the present application.

FIG. 4 shows a schematic diagram of a 1:1 mapping relationship between WUSs and wake up periods. Then, wake up period 1, wake up period 2 and wake up period 3 correspond to their respective WUSs, which are respectively WUS1, WUS2 and WUS3.

Figure 5:
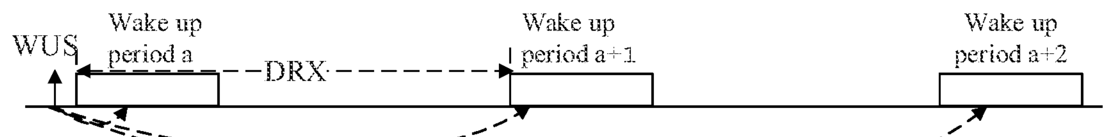
FIG. 5 is a schematic diagram of a 1:N mapping relationship between a WUS and wake up periods according to an example of the present application.

FIG. 5 shows a schematic diagram of a 1:N mapping relationship between a WUS and wake up periods. In this way, if the terminal monitors 1 WUS, it needs to monitor the PDCCH in the N wake up periods corresponding to the WUS. In FIG. 5, 1 WUS maps 3 wake up periods, respectively wake up period a, wake up period a+1, and wake up period a+2.

The effective range of the missed wake up signaling in this example may include one or more wake up periods.

In this example, if the wake up signaling on the target cell is missed, when the wake up signaling is deemed to be monitored according to the monitoring strategy, the PDCCH will be monitored within the effective range of the wake up signaling, to reduce unnecessary power consumption of the terminal caused by the monitoring beyond the effective range.

In some examples, monitoring the PDCCH in wake up periods within an effective range of the wake up signaling includes:

when the mapping relationship between the WUS and the wake up periods is 1:1, and the wake up period corresponding to the WUS has not started, the PDCCH is monitored in one of the wake up periods corresponding to the WUS.

For example, when the mapping relationship between the WUS and the wake up periods is 1:1, the effective range is a wake up period, the PDCCH is monitored in the wake up period.

If the terminal misses the monitoring of the wake up signaling on the target cell when switched from the source cell to the target cell, and the wake up period corresponding to the wake up signaling has not started, the PDCCH is monitored in the remaining time of the wake up period that has not started, reducing missed important content sent by the PDCCH.

Figure 1:
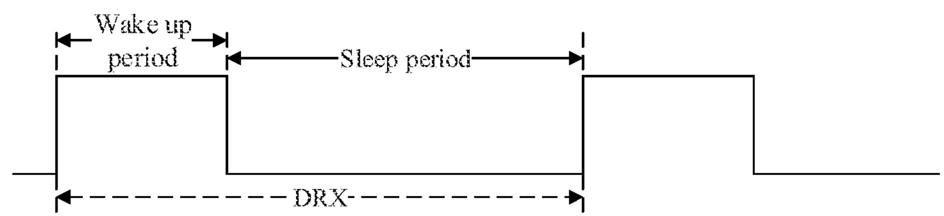
FIG. 1 is a schematic diagram of a DRX.
Figure 6A:
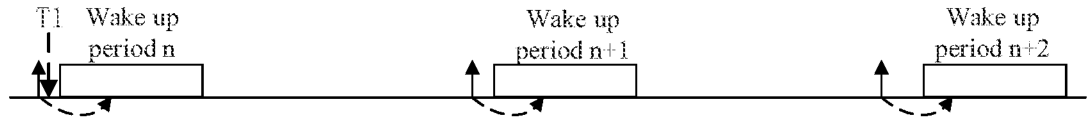
FIG. 6A is a schematic diagram of switching to a target cell in the case of a 1:1 mapping relationship between a WUS and a wake up period according to an example of the present application.

Referring to FIG. 6A, 1:1 mapping between a WUS and a wake up period is shown. FIG. 6A shows switching to the target cell at time T1 prior to the start time of the wake up period n corresponding to the WUS after the monitoring time of the WUS in the target cell, and monitoring the PDCCH in the wake up period n.

In some examples, monitoring the PDCCH in wake up periods within an effective range of the wake up signaling includes:

when the mapping relationship between the WUS and the wake up periods is 1:N, the PDCCH is monitored in M1 wake up periods that have not started corresponding to the WUS.

The value of N may be 2, 3 or 4, etc. In short, N may be 2 or a value greater than 2.

In this way, when the mapping relationship between WUS and wake up periods is 1:N, no matter whether the switching time is within the wake up period corresponding to the WUS or beyond the wake up period, the PDCCH is monitored in the remaining wake up periods that have not started.

The switching time may be: the time when the terminal is switched from the source cell to the target cell.

In some examples, when the mapping relationship between the WUS and the wake up periods is 1:N, monitoring the PDCCH in M1 wake up periods that have not started corresponding to the WUS may include:

when the mapping relationship between the WUS and the wake up periods is 1:N, and the current wake up period corresponding to the WUS has started, the PDCCH is monitored in the M1 wake up periods that have not started corresponding to the WUS, where M1 is a positive integer less than N and greater than 1, and N is a positive integer equal to or greater than 2.

For example, n=3, M=2; if the terminal is switched to the target cell within the time corresponding to the first wake up period, in this example, the terminal will not continue to monitor the PDCCH in the remaining time of the first wake up period that has started but not ended, but directly start the monitoring of the PDCCH from the second wake up period, and monitor the PDCCH in the second wake up period and the third wake up period.

In other examples, when the mapping relationship between the WUS and the wake up periods is 1:N, monitoring the PDCCH in M1 wake up periods that have not started corresponding to the WUS may include:

when the mapping relationship between the WUS and the wake up periods is 1:N, and the current wake up period corresponding to the WUS has not started, the PDCCH is monitored in M2 wake up periods that have not started corresponding to the WUS, where M2 is a positive integer less than or equal to N and greater than 1, and N is a positive integer equal to or greater than 2.

For example, n=3, M=2; if the terminal is switched to the target cell after the first wake up period and before the second wake up period, in this example, the terminal will directly start the monitoring of the PDCCH from the second wake up period, and monitor the PDCCH in the second wake up period and the third wake up period.

Figure 6B:
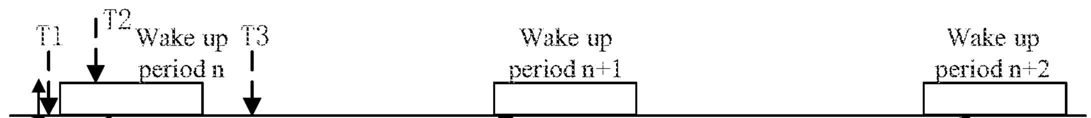
FIG. 6B is a schematic diagram of switching to a target cell in the case of a 1:N mapping relationship between a WUS and wake up periods according to an example of the present application.

Case 1 shown in FIG. 6B: the terminal is switched to the target cell at time T1, which is after the monitoring time of the wake up signaling on the target cell and before the start time of the wake up period n corresponding to the wake up signaling, then if the missed WUS of the previous monitoring time is mapped to 3 wake up periods, respectively wake up period n, wake up period n+1 and wake up period n+2, the terminal will monitor the PDCCH in the wake up period n, wake up period n+1 and wake up period n+2.

Case 2 shown in FIG. 6B: the terminal is switched to the target cell at time T2, which is between the monitoring time of the wake up signaling on the target cell and the start time of the wake up period n corresponding to the wake up signaling, then if the missed WUS of the previous monitoring time is mapped to 3 wake up periods, respectively wake up period n, wake up period n+1 and wake up period n+2, the terminal will monitor the PDCCH in the entire wake up period n+1 and wake up period n+2.

Case 3 shown in FIG. 6B: the terminal is switched to the target cell at time T3, which is after the monitoring time of the wake up signaling on the target cell and the end time of the wake up period n corresponding to the wake up signaling, then if the missed WUS of the previous monitoring time is mapped to 3 wake up periods, respectively wake up period n, wake up period n+1 and wake up period n+2, the terminal will monitor the PDCCH in the entire wake up period n+1 and wake up period n+2.

In some examples, switching from a source cell to a target cell, and if a monitoring time of WUS on the target cell is missed, not monitoring the PDCCH according to a monitoring strategy and a result that the WUS has not been monitored, include:

when the mapping relationship between the WUS and the wake up periods is 1:1, and the wake up period corresponding to the WUS has not started, the PDCCH is not monitored in one of the wake up periods corresponding to the WUS.

According to the different mapping relationship between the WUS and the wake up period, the effective range of the missed WUS is different.

For example, if the mapping relationship between WUS and wake up periods is 1:1, the effective range of the missed WUS is of 1 wake up period; for another example, if the mapping relationship between WUS and wake up periods is 1:N, the effective range of the missed WUS is of N wake up periods.

For example, when the mapping relationship between the WUS and the wake up periods is 1:1, and the wake up period corresponding to the WUS has not started, the PDCCH is monitored in one of the wake up periods corresponding to the WUS.

If the WUS has not been monitored as a monitoring result of the WUS according to the monitoring strategy, the PDCCH will not be monitored.

When the mapping relationship between WUS and wake up periods is 1:1, no matter whether the switching to the target cell is within or beyond the wake up period, the PDCCH in the wake up period corresponding to the WUS will not be monitored to reduce unnecessary monitoring.

For another example, when the mapping relationship between the WUS and the wake up periods is 1:N, the PDCCH is not monitored in M3 wake up periods that have not started corresponding to the WUS, M3 is a positive integer less than N and greater than 1, and N is a positive integer equal to or greater than 2.

When the mapping relationship between WUS and wake up periods is 1:N, no matter whether the terminal is switched from the source cell to the target cell within one of the wake up periods or between two wake up periods, the PDCCH will not be monitored in the remaining wake up periods within the effective range of the missed WUS after the switching time.

In some examples, when the mapping relationship between the WUS and the wake up periods is 1:N, and the current wake up period corresponding to the WUS has started, the PDCCH is not monitored in the M3 wake up periods that have not started corresponding to the WUS, M3 is a positive integer less than N and greater than 1, and N is a positive integer equal to or greater than 2.

In other examples, when the mapping relationship between the WUS and the wake up periods is 1:N, and the current wake up period corresponding to the WUS has not started, the PDCCH is not monitored in M4 wake up periods that have not started corresponding to the WUS, where M4 is a positive integer less than or equal to N and greater than 1, and N is a positive integer equal to or greater than 2.

In some examples, the method further includes:

a monitoring instruction carrying the target cell is received;

The result that the WUS has or has not been monitored is determined according to the monitoring instruction of the target cell.

The terminal will receive the monitoring instruction when or after the terminal is switched from the source cell to the target cell.

In this example, the monitoring result of the missed WUS is determined according to the monitoring instruction, the monitoring result including: monitored and not monitored.

In this way, the target cell can dynamically instruct the terminal whether to monitor the PDCCH according to its own capacity and the requirements of service interaction between the target cell and the terminal.

In some examples, the determining, according to the monitoring instruction of the target cell, the monitoring result that the WUS has or has not been monitored includes:

when the monitoring instruction is a first instruction, the result that the WUS has been monitored is determined, or, when the monitoring instruction is a second instruction, the result that the WUS has not been monitored is determined.

For example, the monitoring instruction may be indicated by one or more bits. Here, when the value of the one or more bits is a first value, the monitoring instruction can be regarded as the first instruction; when the value of the one or more bits is a second value, the monitoring instruction can be regarded as the second instruction. The first value is different from the second value.

In this example, the monitoring instruction may be 1 bit carried in any signaling, and the 1 bit can complete the instruction to reduce bit overhead.

For example, the 1 bit monitoring instruction may be a bit carried in a system message, or a bit in radio resource control signaling.

For example, when the monitoring instruction is 1 bit, if the bit value corresponding to the first instruction is “0”, the bit value corresponding to the second instruction is “1”. If the bit value corresponding to the first instruction is “1”, the bit value corresponding to the second instruction is “0”.

In some examples, the receiving of a monitoring instruction carrying the target cell includes:

a cell switching command carrying the monitoring instruction is received.

The cell switching command may be a command of instructing the terminal to perform cell switching. After receiving the cell switching command, the terminal is switched from the source cell to the target cell. The cell switching command may be sent by the source cell or the target cell.

In this example, the cell switching command also carries the monitoring instruction, so specific signaling including the monitoring instruction does not need to be sent, which reduces the frequency of sending signaling.

In some examples, the method further includes: the result that the WUS has or has not been monitored is determined according to a communication protocol or a pre-agreement.

The communication protocol may be a standard written in the terminal in advance that needs to be complied with in the communication process, or may also be a communication protocol downloaded and updated by the terminal during upgrade.

The pre-agreement may be: the terminal and the base station may predetermine in a negotiation manner how to determine whether the missed WUS has been monitored after the terminal is switched from the source cell to the target cell.

In other examples, the method further includes:

the result that the WUS has or has not been monitored is determined according to configuration information of WUS in the target cell and configuration information of WUS in the source cell.

The target cell may configure the WUS sent by it to obtain the configuration information; similarly, the source cell may also configure the WUS sent by it to obtain the configuration information.

In this example, whether the missed WUS has been monitored after switching to the target cell can be determined by combining the configuration information of the two cells.

For example, the determining, according to configuration information of WUS in the target cell and configuration information of WUS in the source cell, the result that the WUS has or has not been monitored, includes:

when a WUS pattern in the target cell is denser than that in the source cell, it is determined that the WUS has been monitored;

or, when a WUS pattern in the target cell is sparser than that in the source cell, it is determined that the WUS has not been monitored.

The WUS pattern in the target cell is denser than that in the source cell, indicating that the WUS sending frequency in the target cell is higher than that in the source cell, then WUS is more likely to be sent at the monitoring time of the previous WUS prior to the switching time missed by the terminal; or else WUS is less likely to be sent at the monitoring time of the WUS that may be missed.

In this example, the WUS monitoring result for determining whether to monitor the PDCCH can be more appropriately determined by comparing the WUS pattern in the target cell with that in the source cell.

In some examples, the monitoring result whether the WUS of the previous monitoring time has been missed can also be determined only based on the WUS configuration information of the target cell. For example, if the intensity of the monitoring time of WUS in the WUS pattern is greater than a preset intensity, it can be considered that the WUS at the missed WUS monitoring time has been monitored, otherwise the WUS has not been monitored.

If the source cell is not configured with the WUS pattern, the density of the WUS pattern of the source cell is considered to be of a default densest WUS pattern.

For example, if the terminal does not receive the WUS pattern in the source cell, it can be considered that the WUS pattern of the source cell is the densest WUS pattern. In this way, when the WUS pattern of the source cell is compared with the WUS pattern of the target cell for the density, the WUS pattern of the source cell will be regarded as the densest WUS pattern for comparison.

Figure 7:
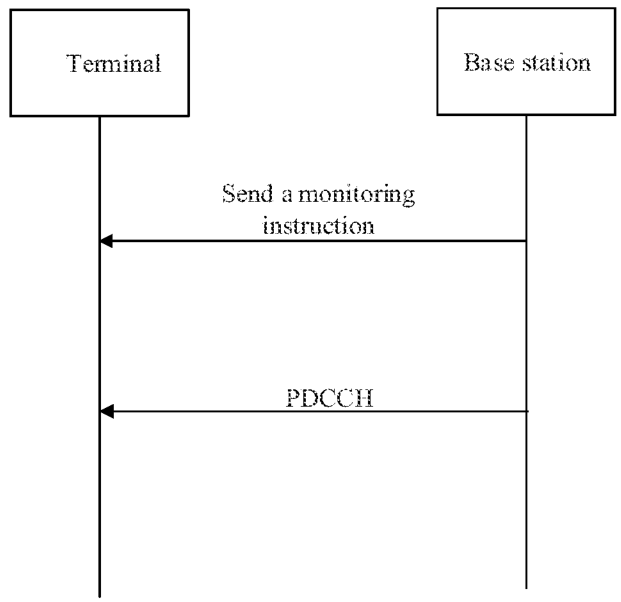
FIG. 7 is a schematic diagram of sending an instruction according to an example of the present application.

As shown in FIG. 7, this example provides a method for sending an instruction, including:

a monitoring instruction is sent, the monitoring instruction is used to switch from a source cell to a target cell, and to determine a result that wake up signaling has or has not been monitored when the wake up signaling on the target cell is missed.

The method provided in this example can be applied to a base station. The base station can send the monitoring instruction through broadcast signaling or a dedicated instruction. In this way, after the terminal is switched from the source cell to the target cell, even if the wake up signaling on the target cell is missed, the terminal can still be instructed to monitor or not monitor the PDCCH according to the result that the wake up signaling has or has not been monitored.

In this example, the method further includes:

a variety of signaling, such as service scheduling signaling, is sent through the PDCCH.

The result that the wake up signaling has or has not been monitored will be used for the terminal to determine whether to monitor the PDCCH.

In some examples, the monitoring instruction is carried in a cell switching command and sent, which increases the sending rate of the monitoring instruction and reduces the number of times the signaling is sent.

Figure 8:
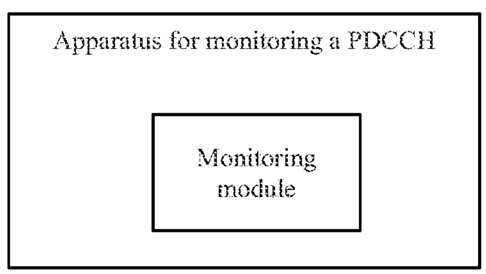
FIG. 8 is a schematic structural diagram of an apparatus for monitoring a PDCCH according to an example of the present application.

As shown in FIG. 8, this example further provides an apparatus for monitoring a PDCCH, including:

a monitoring module, configured to switch from a source cell to a target cell, and to monitor, if a monitoring time of wake up signaling on the target cell is missed, the PDCCH according to a monitoring strategy and a result that the wake up signaling has been monitored.

In some examples, the apparatus further includes a module for storing the monitoring strategy.

The monitoring module may be a program module, a software and hardware combination module or a pure hardware module.

In some examples, the monitoring module is configured to monitor the PDCCH in wake up periods within an effective range of the WUS according to the monitoring strategy and the result that the WUS has been monitored.

In some examples, the monitoring module is configured to:

when the mapping relationship between the WUS and the wake up periods is 1:1, and the wake up period corresponding to the WUS has not started, the PDCCH is monitored in one of the wake up periods corresponding to the WUS.

In some examples, the monitoring module is configured to, when the mapping relationship between the WUS and the wake up periods is 1:N, and the current wake up period corresponding to the WUS has started, monitor the PDCCH in M1 wake up periods that have not started corresponding to the WUS, M1 is a positive integer less than N and greater than 1, and N is a positive integer equal to or greater than 2.

In some examples, the monitoring module is configured to, when the mapping relationship between the WUS and the wake up periods is 1:N, and the current wake up period corresponding to the WUS has not started, monitor the PDCCH in M2 wake up periods that have not started corresponding to the WUS, M2 is a positive integer less than or equal to N and greater than 1, and N is a positive integer equal to or greater than 2.

In some examples, the monitoring module is configured to not monitor the PDCCH according to the monitoring strategy and a result that the WUS has not been monitored.

In some examples, the monitoring module is configured to, when the mapping relationship between the WUS and the wake up periods is 1:1, and the wake up period corresponding to the WUS has not started, not monitor the PDCCH in one of the wake up periods corresponding to the WUS.

In some examples, the monitoring module is configured to, when the mapping relationship between the WUS and the wake up periods is 1:N, and the current wake up period corresponding to the WUS has started, not monitor the PDCCH in M3 wake up periods that have not started corresponding to the WUS, M3 is a positive integer less than N and greater than 1, and N is a positive integer equal to or greater than 2.

In some examples, the monitoring module is configured to, when the mapping relationship between the WUS and the wake up periods is 1:N, and the current wake up period corresponding to the WUS has not started, not monitor the PDCCH in M4 wake up periods that have not started corresponding to the WUS, M4 is a positive integer less than or equal to N and greater than 1, and N is a positive integer equal to or greater than 2.

In some examples, the apparatus further includes:

a receiving module, configured to receive a monitoring instruction carrying the target cell; and a first determination module, configured to determine, according to the monitoring instruction of the target cell, the result that the WUS has or has not been monitored.

In some examples, the first determination module is configured to determine the result that the WUS has been monitored when the monitoring instruction is a first instruction; or, determine the result that the WUS has not been monitored when the monitoring instruction is a second instruction.

In some examples, the receiving module is configured to receive a cell switching command carrying the monitoring instruction.

In some examples, the apparatus further includes:

a second determination module, configured to determine, according to a communication protocol or a pre-agreement, the result that the WUS has or has not been monitored.

In some examples, the apparatus further includes:

a third determination module, configured to determine, according to configuration information of WUS in the target cell and configuration information of WUS in the source cell, the result that the WUS has or has not been monitored.

In some examples, the third determination module is configured to determine that the WUS has been monitored when a WUS pattern in the target cell is denser than that in the source cell; or, determine that the WUS has not been monitored when a WUS pattern in the target cell is sparser than that in the source cell.

Figure 9:
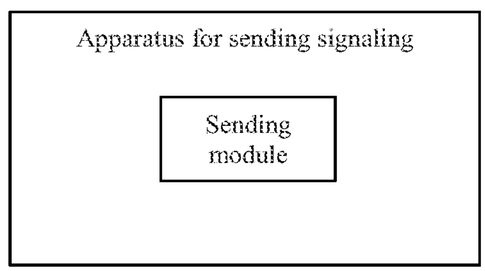
FIG. 9 is a schematic structural diagram of an apparatus for sending an instruction according to an example of the present application.

As shown in FIG. 9, this example further provides an apparatus for sending an instruction, including:

a sending module, configured to send a monitoring instruction, the monitoring instruction is used to switch from a source cell to a target cell, and to determine a result that wake up signaling has or has not been monitored when the wake up signaling on the target cell is missed.

In some examples, the monitoring instruction is carried in a cell switching command and sent.

The apparatus for sending an instruction according to this example may be an apparatus applied to a network element of an access network such as a base station. The sending module sends signaling carrying the monitoring instruction, and then the terminal can receive determination information.

In some examples, the apparatus for sending an instruction further includes a storage module, which is connected to the sending module and can be used to store the monitoring instruction.

Several specific examples are provided below in conjunction with any of the foregoing examples:

Example 1

A UE is switched to a target cell to perform WUS monitoring according to a WUS monitoring instruction provided by a target base station. The target base station here is a base station of the target cell. Whether missed WUS at a previous monitoring time has been monitored is determined according to the monitoring instruction.

If the UE is switched to the target cell and misses the WUS monitoring time on the target cell, the monitoring strategy adopted is to process the missed WUS at the previous monitoring time according to a result that the WUS has or has not been monitored: if the WUS is processed according to the result that the WUS has been monitored, the terminal will monitor the PDCCH; if the WUS is processed according to the result that the WUS has not been monitored, the terminal will not monitor the PDCCH. The missed WUS here is the aforementioned wake up signaling.

As an implementation manner, the monitoring instruction may be an explicit instruction "1", which means that if the UE is switched to the target cell and misses the WUS monitoring time, the monitoring strategy adopted is to process the current missed WUS monitoring time according to the result that the WUS has been detected.

As an implementation manner, the monitoring instruction may be an explicit instruction "0", which means that if the UE is switched to the target cell and misses the WUS monitoring time, the monitoring strategy adopted is to process the current missed WUS monitoring time according to the result that the WUS has not been detected.

Specifically, if the UE is switched to the target cell and misses the WUS monitoring time on the target cell, the monitoring instruction adopted is: processing the current missed previous monitoring time according to the result that the WUS has been monitored, that is, monitoring wake up periods within an effective range of subsequent WUS.

The effective range of WUS includes:

a 1:1 mapping relationship between a WUS and a wake up period, that is, a 1:1 mapping scenario of 1 WUS and 1 wake up period.

A 1:N mapping relationship between a WUS and wake up periods, that is, a 1:N mapping scenario of 1 WUS and N wake up periods.

Example 2

Based on Example 1,

This example aims at the 1:1 mapping scenario. When the terminal misses WUS on the target cell, monitoring or not monitoring the PDCCH according to the monitoring strategy includes:

when the terminal is switched to the target cell, and the wake up period corresponding to the WUS has not started, the terminal monitors or does not monitor the PDCCH in the coming wake up period.

Example 3

Based on Example 1,

This example aims at the 1:N mapping scenario. When the terminal misses WUS on the target cell, there are several possible cases of monitoring or not monitoring the PDCCH according to the monitoring strategy:

Case 1:

When the terminal is switched to the target cell, and the wake up period corresponding to the WUS on the target cell has not started at the current time, the terminal continues to monitor remaining M coming wake up periods that have not yet started. M is a number of removing the wake up period that the terminal has missed from N.

For example, if N=4, and the terminal is switched to the target cell before the start time of the second wake up period, the terminal starts monitoring from the remaining time of the second wake up period, which includes part of the wake up period and remaining 2 wake up periods.

Case 2:

When the terminal is switched to the target cell, and the wake up period corresponding to the missed WUS on the target cell has started, the terminal continues to monitor remaining M coming wake up periods from the time of switching to the target cell. For example, if N=4, and the terminal is switched to the target cell after the second wake up period starts, the terminal starts monitoring from the third wake up period, that is, continues monitoring from the remaining two wake up periods that have not started.

Example 4

Based on Examples 1, 2, and 3, this example provides a way to determine whether the missed WUS at the previous monitoring time has been monitored, including:

as an implementation manner if the terminal is switched to the target cell and misses the WUS monitoring time, the monitoring strategy adopted is: processing the current missed WUS monitoring time according to the result that the WUS has or has not been detected. Whether the WUS has been detected can also be determined based on a protocol.

As another implementation manner the protocol provides that if the UE is switched to the target cell and misses the WUS monitoring time, the monitoring strategy adopted is to process the current missed WUS monitoring time according to the result that the WUS has been detected:

If the UE is switched to the target cell and misses the WUS monitoring time, the monitoring strategy adopted is to process the current missed WUS monitoring time according to the result that the WUS has or has not been detected. Whether the WUS has been detected can also be determined based on WUS pattern configuration of the source cell and/or target cell:

As an example, if the UE finds that the WUS pattern configured in the target cell is denser than that in the source cell, for example, the WUS patterns configured in the source cell and the target cell are 3:1, then when the UE is switched to the target cell and misses the WUS monitoring time, the monitoring strategy adopted is to process the current missed WUS monitoring time according to the result that the WUS has been detected; this means that the target cell needs to be monitored more densely.

As an example, if the UE finds that the WUS pattern configured in the target cell is sparser than that in the source cell, for example, the WUS patterns configured in the source cell and the target cell are 1:3, then when the UE is switched to the target cell and misses the WUS monitoring time, the monitoring strategy adopted is to process the current missed WUS monitoring time according to the result that the WUS has not been detected; this means that the target cell needs to be monitored more sparsely.

The communication device may also be a network element of an access network such as a base station, which can implement the method for sending an instruction according to any of the foregoing technical solutions.

The communication device provided in this example includes: a transceiver, a memory, and a processor. The transceiver may be configured to interact with other devices. The transceiver includes but is not limited to a transceiver antenna. The memory may store computer-executable instructions; the processor is connected to the transceiver and the memory respectively, and can implement the method for monitoring a PDCCH or the method for sending signaling according to any of the foregoing technical solutions.

Figure 10:
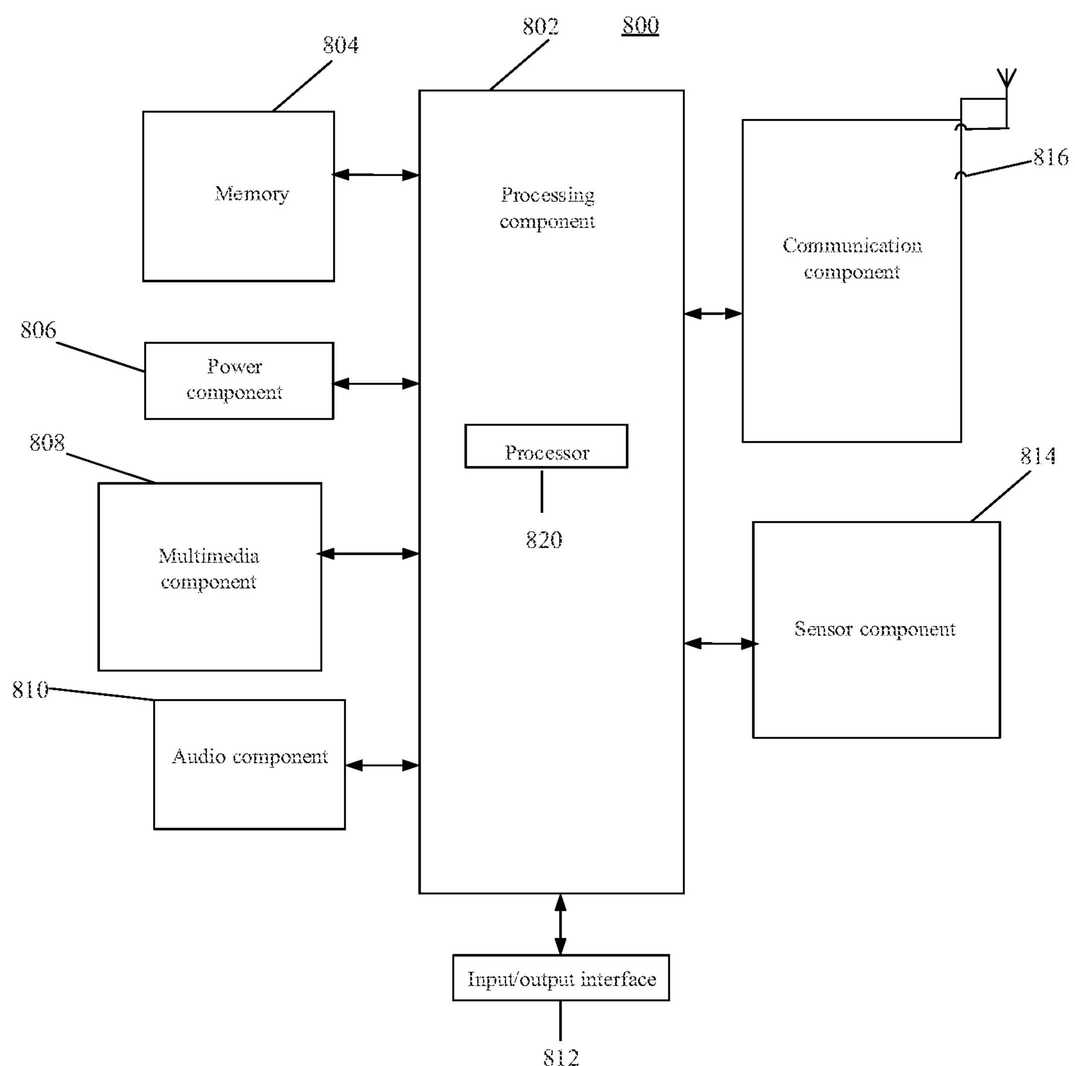
FIG. 10 is a schematic structural diagram of a terminal according to an example of the present application.

FIG. 10 shows a terminal according to an example. The terminal may be a mobile phone, a computer, a digital broadcasting terminal, a messaging device, a game console, a tablet device, a medical device, a fitness device, a personal digital assistant, etc.

Referring to FIG. 10, the device 800 may include one or more of the following components: a processing component 802, a memory 804, a power component 806, a multimedia component 808, an audio component 810, an input/output (I/O) interface 812, a sensor component 814, and a communication component 816.

The processing component 802 usually controls the overall operations of the device 800, such as operations associated with display, telephone call, data communication, camera operation and recording operation. The processing component 802 may include one or more processors 820 to execute instructions to complete all of or part of the steps of the above method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support the operations at the electronic equipment 800. Examples of these data include instructions for any application or method operated on the device 800, contact data, phone book data, messages, pictures, videos, etc. The memory 804 may be implemented by any type of volatile or non-volatile storage device or a combination thereof, such as a static random access memory (SRAM), an electrically erasable programmable read-only memory (EEPROM), an erasable. programmable read-only memory (EPROM), a programmable read-only memory (PROM), a read-only memory (ROM), a magnetic memory, a flash memory, a magnetic disk or an optical disk.

The power component 806 supplies power to various components of the device 800. The power component 806 may include a power management system, one or more power sources, and other components associated with power generation, management and distribution of the device 800.

The multimedia component 808 includes a screen for providing an output interface between the device 800 and the user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides and gestures on the touch panel. The touch sensor may sense not only the boundary of a touch or slide, but also the duration and pressure associated with the touch or slide. In some examples, the multimedia component 808 includes a front camera and/or a rear camera. When the device 800 is in an operation mode, such as a shooting mode or a video mode, the front camera and/or the rear camera may receive external multimedia data. Each front or rear camera may be a fixed optical lens system or have a focal length and optical zoom capability.

The audio component 810 is configured to output and/or input audio signals. For example, the audio component 810 includes a microphone (MIC), which is configured to receive external audio signals when the device 800 is in an operational mode, such as a call mode, a recording mode and a voice recognition mode. The received audio signals may be further stored in the memory 804 or sent by the communication component 816. In some examples, the audio component 810 further includes a speaker for outputting audio signals.

The I/O interface 812 provides an interface between the processing component 802 and a peripheral interface module. The peripheral interface module may be a keyboard, a click wheel, buttons, etc. These buttons may include, but are not limited to a home button, a volume button, a start button and a lock button.

The sensor component 814 includes one or more sensors for providing various aspects of status assessment for the device 800. For example, the sensor component 814 may detect an on/off state of the device 800, and relative positions of components such as a display and a keypad of the device 800. The sensor component 814 may also detect a position change of the device 800 or one component of the device 800, presence or absence of contact between the user and the device 800, an orientation or acceleration/deceleration of the device 800 and a temperature change of the device 800. The sensor component 814 may include a proximity sensor configured to detect the presence of nearby objects without any physical contact. The sensor component 814 may also include an optical sensor, such as a CMOS or CCD image sensor, for use in imaging applications. In some examples, the sensor component 814 may also include an acceleration sensor, a gyro sensor, a magnetic sensor, a pressure sensor, or a temperature sensor.

The communication component 816 is configured to facilitate wired or wireless communication between the device 800 and other devices. The device 800 may access a wireless network based on communication standards, such as WiFi, 2G or 3G, or a combination thereof. In an example, the communication component 816 receives broadcast signals or broadcast associated information from an external broadcast management system via a broadcast channel In an example, the communication component 816 further includes a near field communication (NFC) module to facilitate short range communication. For example, the NFC module may be implemented based on radio frequency identification (RFID) technology, infrared data association (IrDA) technology, ultra wide band (UWB) technology, Bluetooth (BT) technology, and other technologies.

In an example, the device 800 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components to perform the above method.

In an example, a non-transitory computer-readable storage medium including instructions is further provided, such as a memory 804 including instructions executable by the processor 820 of the device 800 to complete the above method. For example, the non-transitory computer-readable storage medium may be an ROM, a random access memory (RAM), a CD-ROM, a magnetic tape, a floppy disk, an optical data storage device, etc.

Figure 11:
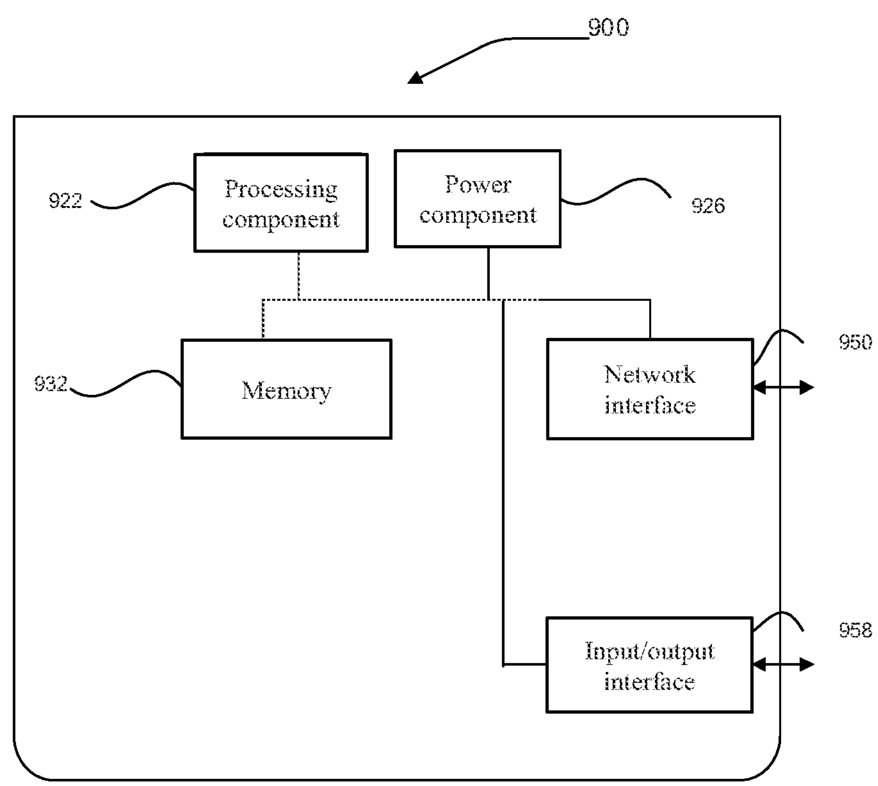
FIG. 11 is a schematic structural diagram of a base station according to an example of the present application.

FIG. 11 is a schematic diagram of a base station. Referring to FIG. 11, the device 900 includes a processing component 922, which further includes one or more processors, and a memory resource represented by a memory 932, for storing instructions executable by the processing component 922, such as applications. The applications stored in the memory 932 may include one or more modules each corresponding to a set of instructions. In addition, the processing component 922 is configured to execute instructions to execute the method for monitoring a PDCCH shown in FIG. 4 and/or FIG. 5.

The base station 900 may further include a power component 926 configured to perform power management of the device 900, a wired or wireless network interface 950 configured to connect the device 900 to a network, and an input/output (I/O) interface 958. The device 900 may operate operating systems stored in the memory 932, such as Windows Server™, Mac OS X™, Unix™, Linux™, FreeBSD™ or the like.

A person skilled in the art would readily conceive of other examples of the present application after considering the specification. The present application is intended to cover any variations, uses or adaptive changes of the present application. These variations, uses or adaptive changes follow the general principle of the present application and include common general knowledge or conventional technical means in the technical field that are not disclosed in the present application. The specification and the examples are merely regarded as exemplary, and the real scope and spirit of the present application are indicated by the following claims.

It should be understood that the present application is not limited to the precise structure described above and shown in the drawings, and various modifications and changes can be made without departing from its scope. The scope of the present application is only limited by the appended claims.

The invention claimed is:

1. A method for monitoring a physical downlink control channel (PDCCH), comprising:

determining whether a monitoring time of Wake UP Signaling (WUS) sent before wake up period by a target cell when switching from a source cell to the target cell is missed; and in response to determining that the monitoring time of WUS sent before wake up period by the target cell being missed when switching from the source cell to the target cell, monitoring the PDCCH in wake up period(s) within an effective range of the WUS according to the result that the WUS has been monitored, wherein a terminal does not monitor the PDCCH prior to the wake up period.

2. The method according to claim 1, wherein the monitoring the PDCCH in wake up periods within the effective range of the WUS comprises:

in response to the effective range of the WUS comprising one wake up period, and a wake up period corresponding to the WUS having not started, monitoring the PDCCH in the wake up period corresponding to the WUS.

3. The method according to claim 1, wherein the monitoring the PDCCH in wake up periods within the effective range of the WUS comprises:

in response to the effective range of the WUS comprising N wake up periods, and a current wake up period corresponding to the WUS having started, monitoring the PDCCH in M1 wake up periods that have not started corresponding to the WUS, where M1 is a positive integer less than N and greater than 1, and N is a positive integer greater than 2.

4. The method according to claim 1, wherein the monitoring the PDCCH in wake up periods within the effective range of the WUS comprises:

in response to the effective range of the WUS comprising N wake up periods, and a current wake up period corresponding to the WUS having not started, monitoring the PDCCH in M2 wake up periods that have not started corresponding to the WUS, where M2 is a positive integer less than or equal to N and greater than 1, and N is a positive integer equal to or greater than 2.

5. A communication device, comprising:

a transceiver, a memory, and a processor, connected to the transceiver and the memory respectively, configured to control transmission of the transceiver and to implement a method for monitoring a physical downlink control channel (PDCCH) by executing computer-executable instructions stored on the memory, the method comprising:

determining whether a monitoring time of Wake UP Signaling (WUS) sent before wake up period by a target cell when switching from a source cell to the target cell is missed; and in response to determining that a monitoring time of WUS sent before wake up period by the target cell being missed when switching from the source cell to the target cell, monitoring the PDCCH in wake up period(s) within an effective range of the WUS according to the result that the WUS has been monitored, wherein the communication device does not monitor the PDCCH prior to the wake up period.

* * * * *